(12) United States Patent
Bogin et al.

(10) Patent No.: US 7,343,469 B1
(45) Date of Patent: Mar. 11, 2008

(54) REMAPPING I/O DEVICE ADDRESSES INTO HIGH MEMORY USING GART

(75) Inventors: Zohar Bogin, Folsom, CA (US); Jeffrey L. Rabe, Gold River, CA (US)

(73) Assignee: Intel Corporation, Santa Clara, CA (US)

( * ) Notice: Subject to any disclaimer, the term of this patent is extended or adjusted under 35 U.S.C. 154(b) by 10 days.

(21) Appl. No.: 09/667,050

(22) Filed: Sep. 21, 2000

(51) Int. Cl.
*G06F 12/00* (2006.01)

(52) U.S. Cl. .................. 711/209; 711/220; 711/202; 711/203; 711/221

(58) Field of Classification Search ............ 711/202, 711/203, 205, 206, 207, 209, 212, 220, 221
See application file for complete search history.

(56) References Cited

U.S. PATENT DOCUMENTS 5,060,137 A * 10/1991 Bryg et al. .................. 711/205
6,282,625 B1 * 8/2001 Porterfield ................... 711/206
6,526,459 B1 * 2/2003 Campbell et al. ............. 710/51
6,625,673 B1 * 9/2003 Dickey et al. ................ 710/52

* cited by examiner

*Primary Examiner*—Kimberly McLean
(74) *Attorney, Agent, or Firm*—Blakely, Sokoloff, Taylor & Zafman LLP

(57) ABSTRACT

An address translation apparatus and method that can convert a limited-range memory address from a peripheral device to an expanded-range memory address on the fly. The invention can expand the limited address capability of a peripheral bus, such as a PCI bus with a 4 GB address range, to a much larger address capability, such as a 64 GB address range. This conversion can be performed on the fly by hardware, so that no appreciable delay in transfer time is created. The conversion can be performed by adding features to a conventional graphics controller interface, thus minimizing the impact on circuit complexity and system cost.

13 Claims, 4 Drawing Sheets

REMAPPING I/O DEVICE ADDRESSES INTO HIGH MEMORY USING GART

BACKGROUND OF THE INVENTION

1. Field of the Invention

The invention pertains generally to computer systems. In particular, it pertains to address mapping in computer systems.

2. Description of the Related Art

Computer memory is usually addressed either directly or through the use of mapping. Direct addressing involves specifying a memory address by placing the address into a register. The address contained in that register is then directly applied to the addressing bits on a memory bus. Since a register has a predetermined number of bits, the address range that can be specified in the register is limited to the range that can be specified with that number of bits. Many modern computer systems, such as system 10 of FIG. 1, use 32-bit registers and address buses, permitting them to directly address up to 4 gigabytes (GB) of memory. Since register width and memory address width are usually the same, software programs and their associated data are also generally limited to a 4 GB address space. FIG. 1 shows input-output (I/O) controller 11 with an internal 32-bit address bus for controlling transfers between the various attached devices. For simplicity, only the number of address lines are marked in the figures. As a person of ordinary skill in the art will readily recognize, the address lines will be accompanied by data lines and control lines as well. The exact number and configuration of these lines will depend on the particular bus standards being followed.

To reach more memory than is directly addressable by the contents of a register, two approaches are commonly used. In the two-stage approach, the standard address register provides some of the bits, while a separate register provides additional bits to extend the addressing range. For example, the separate register specifies one of several 4 GB blocks, while the standard 32-bit register specifies an address within that 4 GB block. Thus, a separate 4-bit register could specify one of sixteen blocks, for a total addressable space of 64 GB. Since most programs and their associated data will fit into a 4 GB memory space, the contents of the separate register do not need to be changed frequently, and the selected 4 GB block of memory can remain selected for a reasonable time. FIG. 1 shows the 4 additional address bits going from memory map 13 to memory controller 15 for a total of 36 address bits to memory 14.

Alternately, an equivalent function can be performed in the CPU, which then outputs the 36 address bits directly. In this configuration, memory map 13 or its functional equivalent is internal to CPU 12 rather than I/O controller 11.

In a similar but unrelated mapping effort, graphics controllers have conventionally provided 32-bit direct addressing of a contiguous 4 GB address space. However, the memory to be addressed is physically located in main memory, which is allocated to the graphics application in small blocks on an as-available basis. Thus the memory allocated for the graphics application at any given time, while addressed by the graphics controller as a range of contiguous virtual addresses, is actually provided as a disjointed set of smaller blocks of physical addresses, which may not even be in the same order. To correlate the virtual addresses to the physical addresses, a mapping table is provided, which translates each page (or other predetermined block size) of virtual memory into the physical page of memory allocated to it. FIG. 1 shows a graphics address redirection table (GART) 17 for translating 32-bit addresses between graphics controller 16 and memory controller 15.

Although such mapping techniques have been applied to main memory and graphics, standard I/O buses and their attached peripherals have generally not benefited from such address mapping techniques. Most standard I/O buses, such as peripheral component interconnect (PCI) bus 18, are limited to 32 or fewer address bits, and therefore cannot directly address more than 4 GB of memory. Since they frequently transfer data directly between the peripherals and main memory, this limits these transfers to the lower 4 GB of main memory, while the programs that use the data may be located in higher 4 GB sections of memory and therefore be unable to directly reach the data. The conventional approach to this problem is to transfer the data to/from the lower 4 GB memory space through bus controller 19 over the internal bus of I/O controller 11, and use software to transfer the data between the lower 4 GB and the 4 GB section of memory 14 that the application program is located in. This process is very slow and places an unreasonable burden on the processor and main memory bus, since it requires three accesses to memory rather than one: 1) write the data to a temporary buffer, 2) read the data from the temporary buffer, and 3) write the data to a permanent buffer. In a system that is already limited by memory bandwidth, this can cause an unacceptable degradation in performance.

DETAILED DESCRIPTION OF THE INVENTION

The invention implements address mapping between an I/O bus interface and main memory that expands the directly addressable range of the I/O bus, while not requiring a separate mapping circuit to implement it. An embodiment of the invention takes advantage of an existing mapping function that is used in a known graphics controller, and enhances it for this use.

Figure 1:
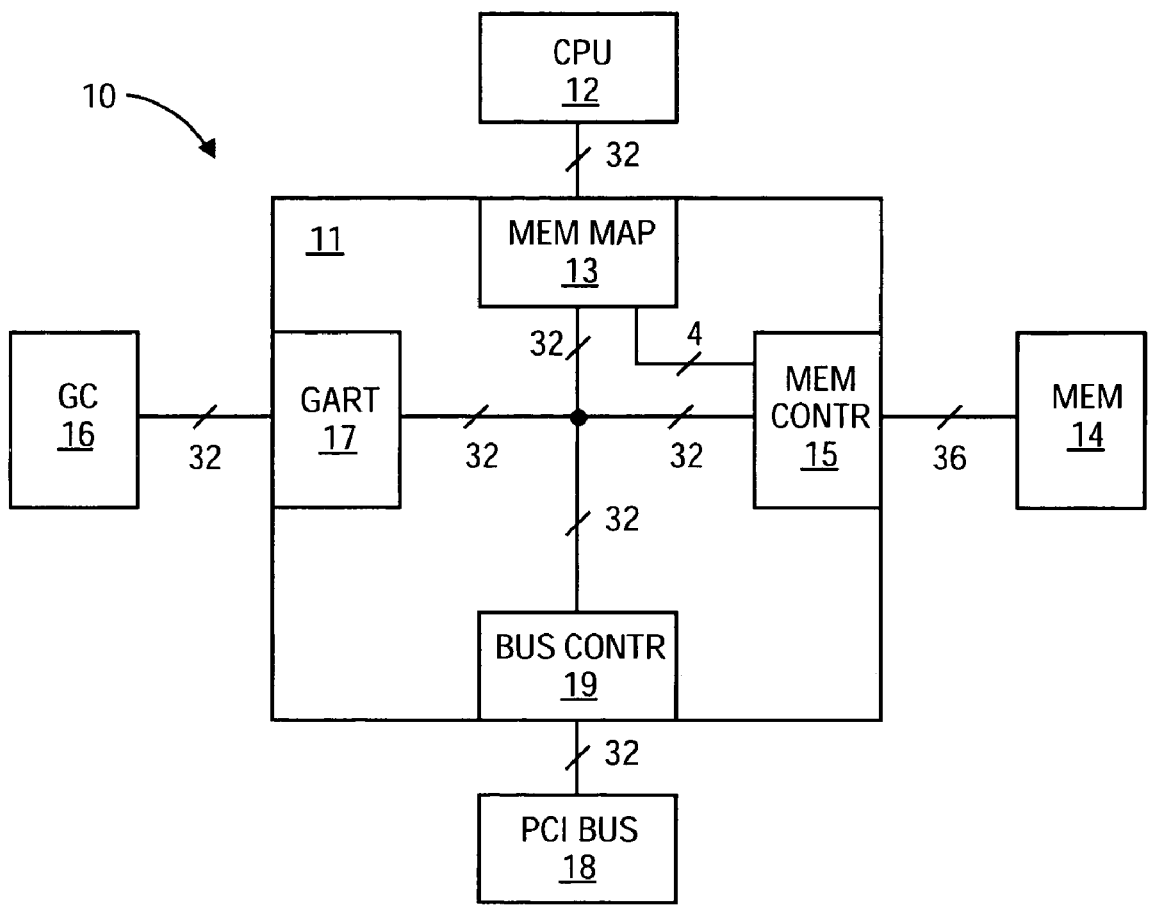
FIG. 1 shows a system of the prior art.
Figure 2:
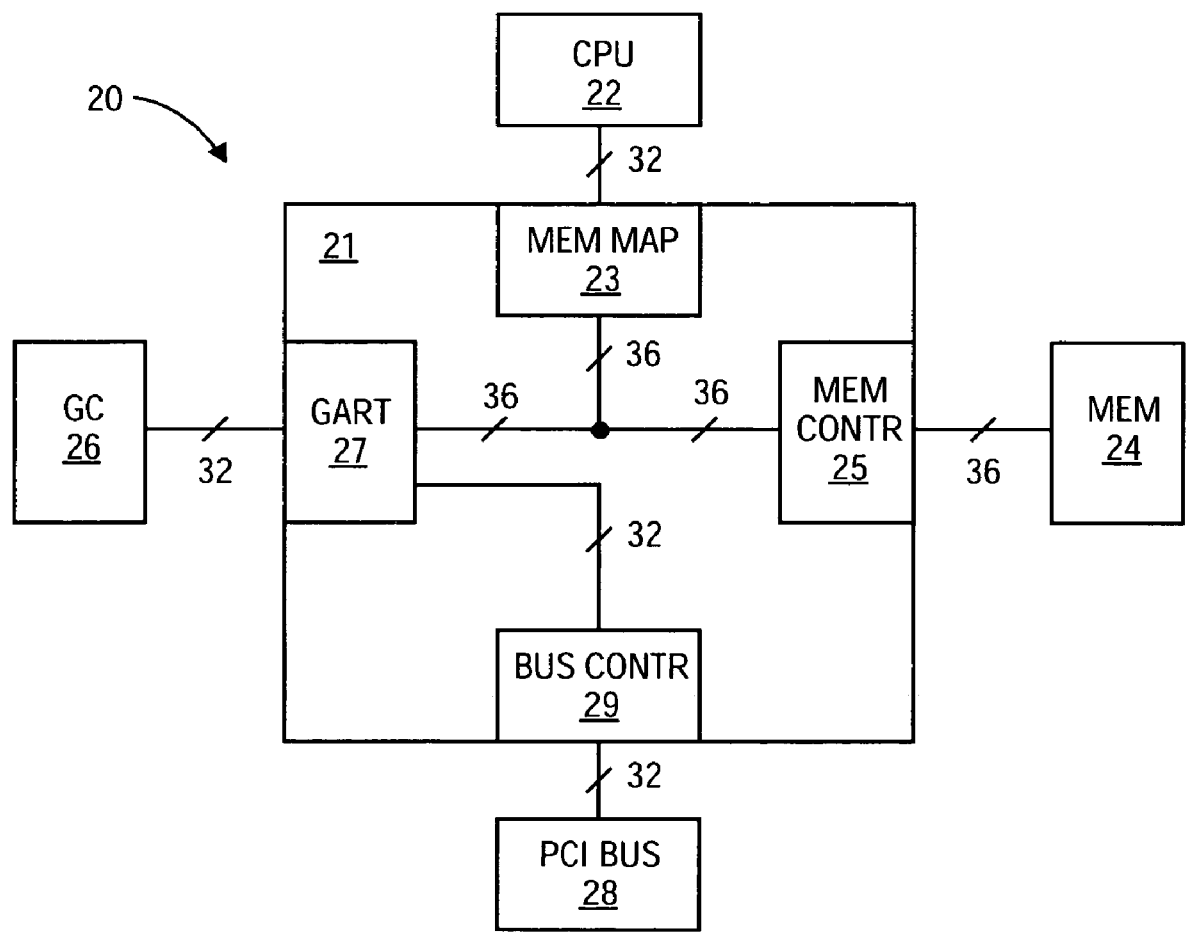
FIG. 2 shows a system of the invention.

FIG. 2 shows a system 20 of the invention. I/O controller 21 can control data transfers between CPU 22, memory 24, graphics controller 26, and bus 28, using memory map 23, memory controller 25, GART 27, and bus controller 29, respectively. This system differs from the prior art system of FIG. 1. Although memory map 23 still provides an enhanced address range to memory controller 25 using the additional address bits (a total of 36 address bits in the illustrated embodiment), GART 27 can also provide the additional address bits, and bus controller 29 can now be coupled to GART 27 instead of being coupled directly to the internal bus as it was in FIG. 1. The expansion of GART 27 to 36 address bits permits GART 27 to directly address up to 64 GB of memory. However, since bus controller 29 is still limited to 32 address bits, it cannot make immediate use of this expanded address capability. By coupling bus controller 29 to GART 27, and modifying the expanded GART to accept an interface to a device other than graphics controller 26, bus controller 29 can be permitted to access memory outside the normal 4 GB range that the bus controller is normally limited to. Thus, devices on PCI bus 28 can transfer data directly to any part of the full memory range of 64 GB, without an intermediate transfer step in the software.

In one embodiment of the invention, memory map 23 can be a part of I/O controller 21, disposed in FIG. 2 between CPU 22 and all other devices interfaced through I/O controller 21. As previously described for FIG. 1, the additional address bits produced by memory map 23 can also be produced directly by CPU 22, using an equivalent mapping function or some other method. Throughout this description, any reference to memory map can also be applied to a CPU that directly outputs all the necessary address bits.

Figure 3:
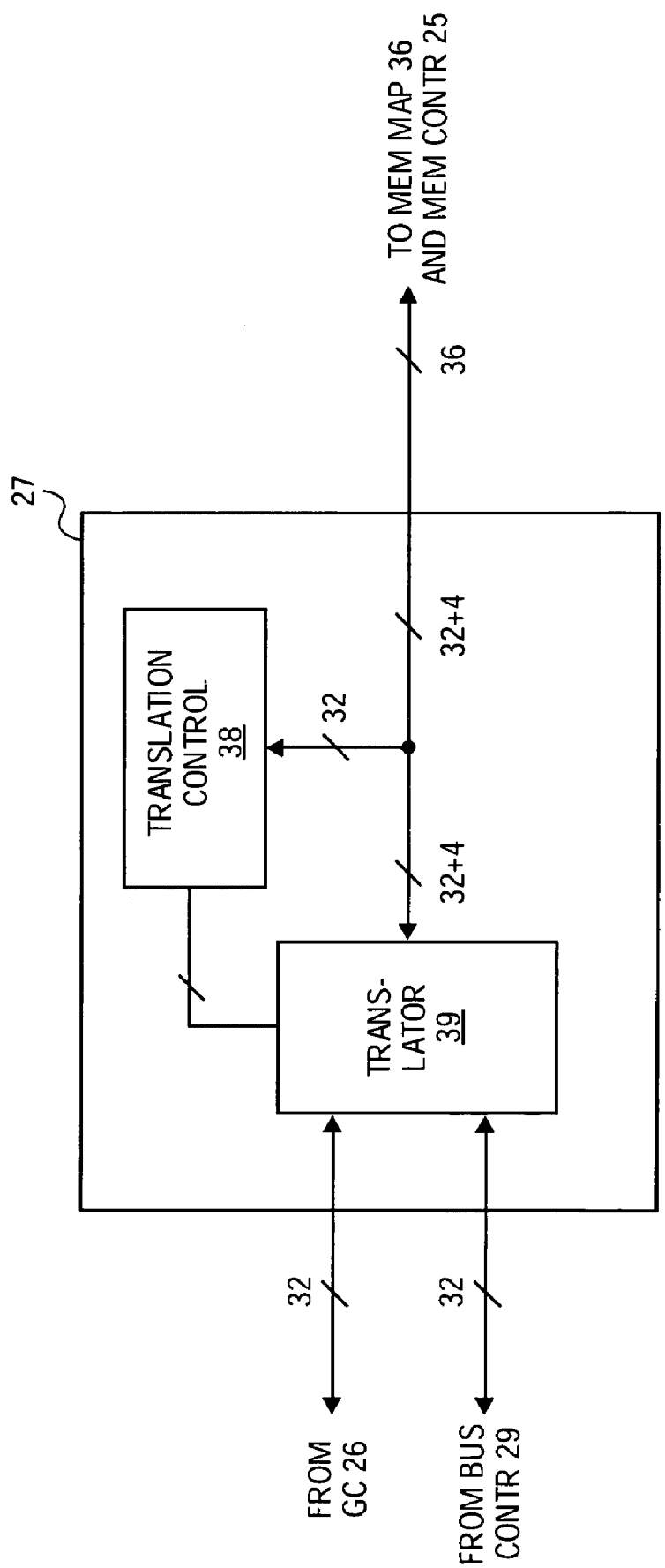
FIG. 3 shows an address translator of the invention.

FIG. 3 shows a more detailed view of a GART 27 of the invention. GART 27 includes address translator 39 and translation control circuit 38. Translator 39 can receive a 32-bit address from graphics controller 26, and can also receive a 32-bit address from bus controller 29. In one embodiment these are two separate interfaces. After the address translation takes place, translator 39 can provide a 36-bit address to memory map 23 and memory controller 25. In one embodiment, this is a common bus interface to both devices.

The translation of one address to another can be programmable, so translation control circuit 38 can receive instructions from CPU 22 on how to program the translation tables, and then place the proper data into translator 39. These instructions can be received over the common bus shared by GART 27, memory map 23 and memory controller 25. Since translation control circuit 38 is an addressable device itself, it typically has an address that is within the standard peripheral address range, and does not need the additional 4 address bits. The portion of the bus connected to translation control circuit 38 is therefore shown as having only the standard 32 address bits, while the connected portions of the same bus are shown in FIG. 3 as "32+4" to indicate they have the basic 32 address bits shared with circuit 38, plus the extra 4 address bits used for the expanded address range.

Figure 4:
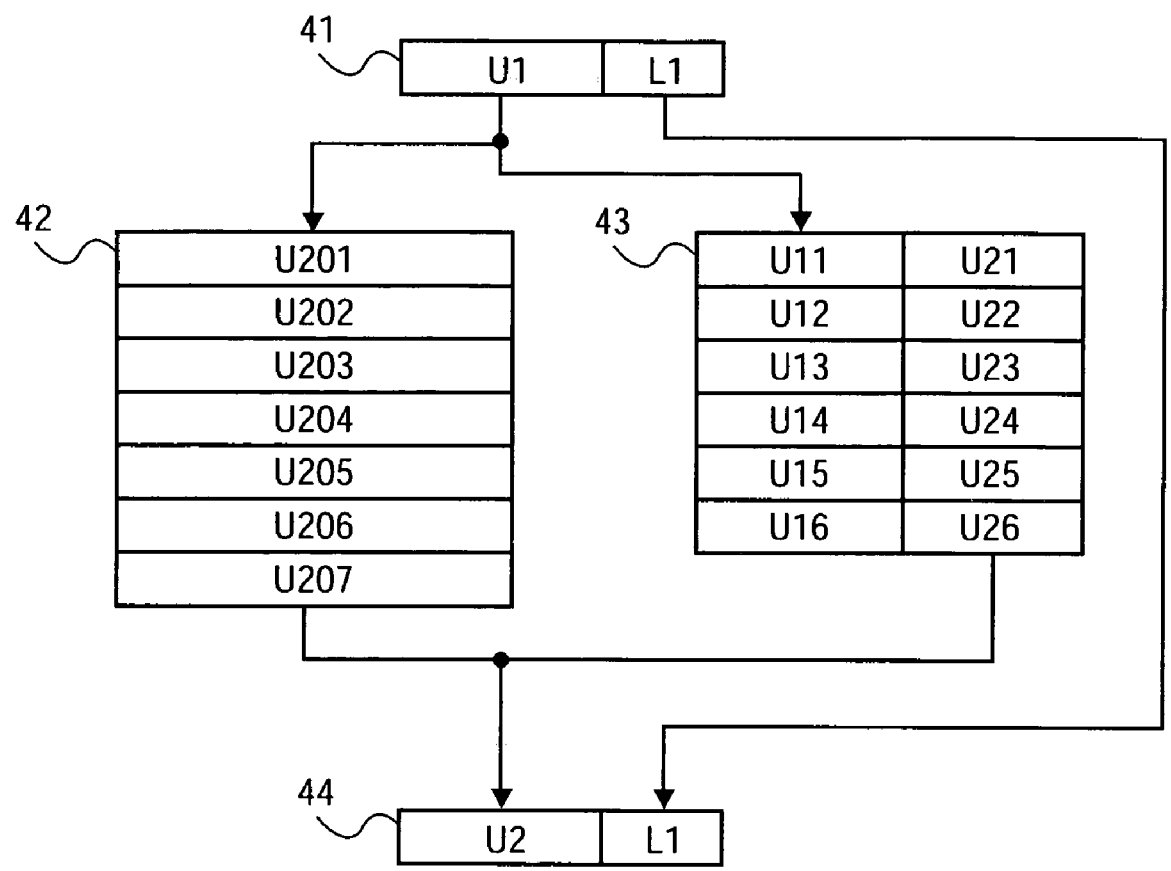
FIG. 4 shows a conceptual chart of a mapping scheme of the invention.

FIG. 4 shows a conceptual flow diagram of the operation of translator 39. When a 32-bit address from bus controller 29 is received by input register 41, the address has an upper portion U1 and a lower portion L1. In one embodiment, upper portion U1 contains 20 address bits that will be translated, while lower portion L1 contains 12 address bits that will remain unchanged, so that memory can be translated in blocks of 4 kilobytes (KB). Other block sizes can also be chosen. Once the address is received in register 41, the upper portion U1 can be compared with the contents of a table 43, which can be configured as a graphics translation lookaside buffer (GTLB). Table 43 can also be thought of as a content-addressable memory (CAM), because upper address portion U1 can be compared against all entries U11-U16 to see if it matches the contents of any of those entries. If a match is found, the corresponding entry U21-U26 can then be delivered to the upper bits of output register 44, where it provides the upper portion U2 of the translated address. This can be merged with the original lower portion L1 to form the complete translated address in output register 44. The number of bits in entries U21-U26 can be independent of the number of bits in entries U11-U16. Following the previous examples, U1 would contain 20 bits, while U2 would contain 24 bits, and L1 would remain constant at 12 bits, resulting in a 32-bit to 36-bit address translation in 4 KB blocks.

The matching function used in the preceding table can become burdensome if the number of entries to be compared becomes large. Therefore the number of entries can be limited to a predetermined number that will not create this burden. In one embodiment, the number of entries in the table is twenty, although only six entries are shown in FIG. 4 for simplicity. Since the number of possible entries that might eventually be placed in the table is much larger, the table can be configured as a cache memory, with the most likely entries placed in the table and later replaced by other, more likely entries as circumstances require. In general, the system can initialize table 43 with one or more predetermined destination buffers for impending transfers, so the correct entries will be missing from table 43 only if there are more intended transfers than can be contained in table 43 at one time. Alternately, well-known cache replacement schemes can be used to update the contents of table 43.

With a well-managed replacement scheme, most addresses placed in input register 41 will be contained in table 43. For those few that are not, an alternate process can be followed. If table 43 is searched and upper portion U1 is not contained in table 43, GART 27 can then access table 42 in main memory 24. Table 42 can contain a much larger number of entries than table 43, and in fact can contain all possible entries that might match the contents of U1. In one embodiment, table 42 contains thousands of entries, although only seven entries are shown in FIG. 4 for simplicity. Since main memory is usually not configured for a content-addressable search, upper portion U1 can be used as an index into table 42 to locate the table entry associated with the particular value of U1. Various indexing schemes can be used, which are well known in the art and are therefore not further described here. The table entry identified by the indexing operation can contain one of the translation values U201-U207, which is then read into GART 27 and placed into the upper portion U2 of output register 44. It can be merged with the original lower portion L1 to form the desired translated address contained in register 44.

By following this two-stage operation, most addresses can be translated on the fly through table 43, so that the 32-bit address transmitted by a device on the PCI bus will be converted into the proper 36-bit address before reaching memory controller 25, and the PCI device will therefore be able to directly reach the full 64 GB of memory space with little or no increase in bus latency. For a small number of addresses, table 42 in main memory can be accessed before the address translation can be completed, resulting in a delay while main memory is accessed. With a properly managed scheme for updating the entries in table 43, this secondary operation will happen so seldom that overall throughput will be significantly improved over the prior art process of relocating the data in memory after the transfer from the bus to memory is complete.

By modifying an existing circuit (the GART interface) to expand the address range, and using that interface for a device external to it's original purpose, the aforementioned advantages can be implemented without significantly adding new circuitry, and with minimal modifications to existing devices.

Although the bit widths described herein are 32-bit buses/registers with an address range of 4 GB, and an additional 4 bits to expand that to 64 GB, other bit widths can be used without departing from the invention. The invention can be implemented in circuitry or as a method. The invention can also be implemented as instructions stored on a machine-readable medium, which can be read and executed by at least one processor to perform the functions described herein. A machine-readable medium includes any mechanism for storing or transmitting information in a form readable by a machine (e.g., a computer). For example, a machine-readable medium can include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The foregoing description is intended to be illustrative and not limiting. Variations will occur to those of skill in the art. Those variations are intended to be included in the invention, which is limited only by the spirit and scope of the appended claims.

We claim:

1. A method, comprising:
    populating entries within a conversion table to map virtual addresses of a memory range allocated to a graphics controller to physical addresses within main memory, wherein the physical addresses have a greater number of bits than the virtual addresses to enable paging to off-chip components for access to the main memory above a physical address range limit imposed by a register/bus width;
    using the conversion table to translate a virtual address from the graphics controller to a first physical address for access to the main memory; and
    using the conversion table to translate a virtual address from a bus controller to a second physical address for access to the main memory;
    wherein the second physical address has a greater number of bits than the virtual address from the graphics controller and the second physical address has a greater number of bits than the virtual address from the bus controller.

2. The method of claim 1, wherein said using the conversion table to translate the virtual address from the bus controller comprises using a translation lookaside buffer.

3. The method of claim 1, wherein said using the conversion table to translate the virtual address from the bus controller comprises:
    comparing a first portion of the virtual address from the bus controller with entries in a first table;
    if the first portion matches a particular one of the entries in the first table, combining a value associated with the particular one with a second portion of the virtual address from the bus controller to form the fourth address.

4. The method of claim 3, further comprising:
    if the first portion does not match any of the entries in the first table, referring to a second table to translate the virtual address from the bus controller.

5. The method of claim 4, wherein:
    said comparing comprises comparing the first portion of the virtual address from the bus controller with entries in the first table in an input-output controller; and
    said referring to the second table comprises referring to the second table in main memory.

6. An apparatus, comprising:
    a translation lookaside buffer coupled to an input register and an output register;
    control logic coupled to the translation lookaside buffer, the input register, and the output register, the control logic to populate entries within the translation lookaside buffer to map virtual addresses of a memory range allocated to a graphics controller to physical addresses within main memory, wherein the physical addresses have a greater number of bits than the virtual addresses to enable paging to off-chip components for access to the main memory above a physical address range limit imposed by a register/bus width;
    wherein the control logic is to compare a first portion of virtual address from a bus controller in the input register with the entries in the translation lookaside buffer; and if a matching entry is found, to combine a first value associated with the matching entry with a second portion of the virtual address to form a first translated physical address having a greater number of bits than the virtual address and hold the first translated physical address in the output register;
    wherein the control logic is further to access a table in the main memory if the matching entry is not found, find a second value in the table associated with the first portion, combine the second value with the second portion to form a second translated physical address having a greater number of bits than the virtual address, and hold the second translated address in the output register.

7. The apparatus of claim 6, wherein:
    the control logic includes logic for first and second control flows;
    the second control flow is to translate a virtual graphics controller address and does not access the second table; and
    the first control flow is to translate a virtual bus controller address and access the second table.

8. A system, including:
    a processor;
    a main memory;
    a graphics controller;
    a bus controller;
    an input-output controller coupled to the processor, memory, graphics controller and bus controller, the input-output controller including:
    a translation lookaside buffer coupled to an input register and an output register;
    control logic coupled to the translation lookaside buffer, the input register, and the output register, the control logic to populate entries within the translation lookaside buffer to map virtual addresses of a memory range allocated to the graphics controller to physical addresses within the main memory, wherein the physical addresses have a greater number of bits than the virtual addresses to enable paging to off-chip components for access to the main memory above a physical address range limit imposed by a register/bus width;
    wherein the control logic is to compare a first portion of a first virtual address from the bus controller in the input register with entries in the translation lookaside buffer; and if a first matching entry is found, to combine a first value associated with the first matching entry with a second portion of the first virtual address to form a first translated physical address having more bits than the first virtual address and hold the first translated physical address in the output register;
    wherein the control logic is further to compare a first portion of a second virtual address from the graphics controller in the input register with the entries in the translation lookaside buffer; and if a second matching entry is found, to combine a second value associated with the second matching entry with a second portion of the second virtual address to form a second translated physical address having more bits than the second virtual address and hold the second translated address physical in the output register.

9. The system of claim 8, wherein the control logic is further to:

access a table in memory if the first matching entry is not found;
find a third value in the table associated with the first portion of the first virtual address;
combine the third value with the second portion of the first virtual address to form a third translated physical address; and
hold the third translated address in the output register.

10. The system of claim 9, wherein:
the control logic comprises logic for first and second control flows;
the second control flow is to translate a virtual graphics controller address and does not access the table; and
the first control flow is to translate a virtual bus controller address and access the table.

11. An apparatus comprising:
an address translator including a translation lookaside buffer and having a first interface to couple to a memory controller, a second interface to couple to a graphics controller, a third interface to couple to a bus controller, and a table of entries, each entry having a first portion and a second portion;
a translation control circuit coupled to the address translator to program entries in the translation lookaside buffer to map virtual addresses of a memory range allocated to the graphics controller to physical addresses within the main memory, wherein the physical addresses have a greater number of bits than the virtual addresses to enable paging to off-chip components for access to the main memory above a physical address range limit imposed by a register/bus width;
wherein the address translator is to translate a virtual address on the third interface into a first physical address on the first interface having a greater number of bits than the virtual address on the third interface.

12. The apparatus of claim 11, wherein:
the address translator is further to translate a virtual address on the second interface into a second physical address on the first interface having a greater number of bits than the virtual address on the second interface.

13. The apparatus of claim 11, wherein:
the address translator comprises a graphics translation lookaside buffer.

* * * * *